March 8, 1932. B. M. ESTES 1,848,332
PELLET MAKING MACHINE
Filed Sept. 25, 1930 2 Sheets-Sheet 2

INVENTOR
Burr M. Estes
By William James
ATTORNEY

Patented Mar. 8, 1932

1,848,332

UNITED STATES PATENT OFFICE

BURR M. ESTES, OF HOUSTON, TEXAS, ASSIGNOR TO WILLIAMS PATENT CRUSHER AND PULVERIZER COMPANY, OF ST. LOUIS, MISSOURI, A CORPORATION OF MISSOURI

PELLET MAKING MACHINE

Application filed September 25, 1930. Serial No. 484,281

This invention relates to new and useful improvements in pellet making machines of the type wherein the material to be molded is forced, while in plastic stage, through molds or openings of suitable shapes and sizes, the extruded material being cut off at suitable intervals to control the length of the pellets or molded material.

The primary object of my invention is to provide a press or pellet making machine in which the plastic material is forced or extruded through the molds by friction or wiping action exerted against said material by the correlation of the molding member or cylinder and a blade angularly disposed relative to the inner face of said cylinder, at least one of said members being movable relatively to the other in a predetermined direction with respect to the inclination of said blade member.

Other objects of the invention are to provide a press for molding plastic material comprising a perforate cylinder and a blade member revolubly mounted in said cylinder and operable relatively thereto, the blade being disposed angularly relative to the inner face of said cylinder and with respect to the direction of travel thereof, whereby the material contained in the cylinder is forced or extruded through the perforations thereof by friction or wiping effect produced by the blade.

Further objects of the invention are to provide a friction press for making pellets or cubes of plastic material, said press including a revoluble perforate cylinder and a revolving head arranged within said cylinder and provided with a plurality of blades angularly disposed relative to the inner face of said cylinder and to the direction of travel of said blades whereby the plastic material is wedged between said blades and the inner face of said cylinder and is extruded through the molding orifices thereof by the wiping action or friction exerted upon the material by said blades.

Still further objects of the invention are to provide a molding cylinder provided with a plurality of spaced peripheral openings through which the material is extruded, the mouth or inner end of each orifice being enlarged and provided with an angularly disposed wall presented opposite to the direction of travel of the wiping member.

Additional objects of the invention are to simplify and improve upon the construction and operation of machines for making pellets and cubes from plastic material, thereby assuring efficient production and reducing the cost of operation and manufacture.

With these and other objects in view, my invention consists in certain novel features of construction and arrangement of parts, hereinafter more fully described and claimed, and illustrated in the accompanying drawings, in which—

Figure 3 is an enlarged fragmental detail view showing the inner face of the cylinder.

Figure 4 is an enlarged detail view showing the cross section through one of the molding apertures.

Figure 1:
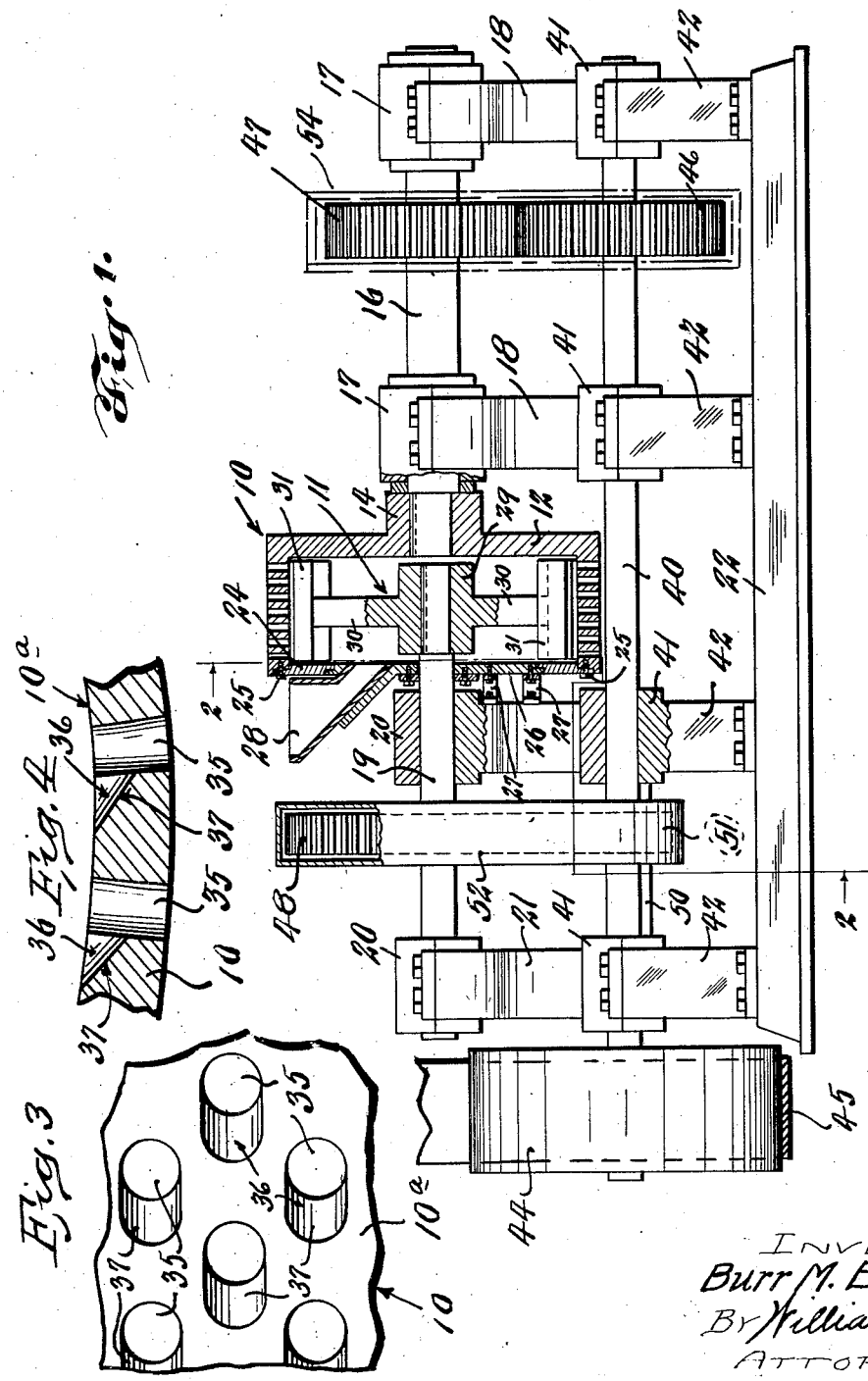
Figure 1 is a side elevational view of my improved machine, partly in cross section.
Figure 2:
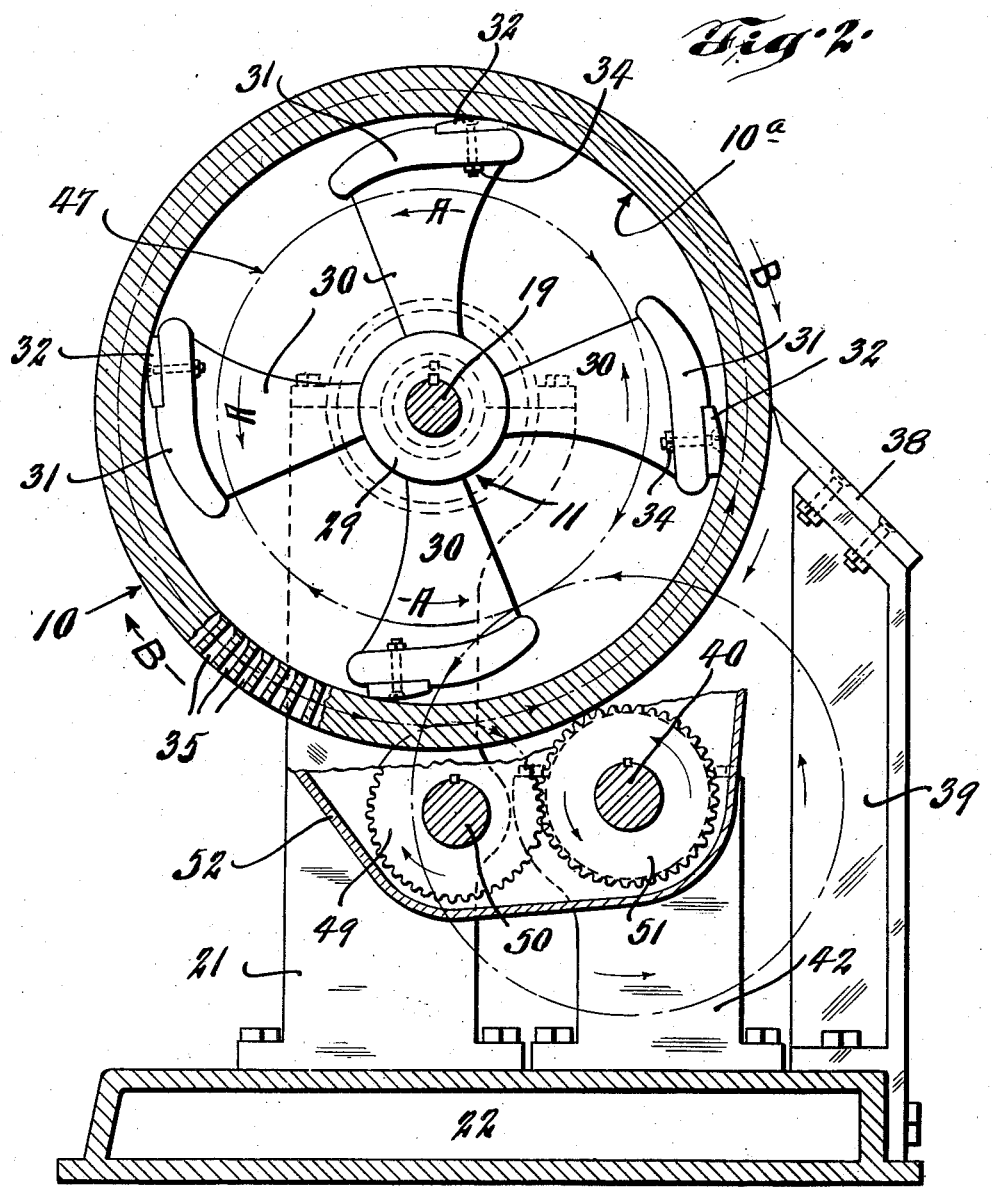
Figure 2 is a vertical cross section taken on line 2—2 of Figure 1.

Heretofore in molding plastic material, such as stock feed material, into pellets or cubes, it was necessary to exert pressure against the material contained in the cylinder by means of a revoluble roller arranged within said cylinder and having eccentric movement relatively thereto. As the roller was actuated around the inner face of the cylinder the material was pressed outwardly through the perforations or molding orifices of the cylinder. In this form of press both the cylinder and the pressure roller are actuated in the same direction.

This type of machine is unsatisfactory as it requires a great deal of power to operate, resulting in frequent breakdowns. Also the capacity of the press is limited since only one roller is used and both the roller and the cylinder operate in the same direction. Consequently the press is most effective only on the upward half of cycle of movement. It is not possible to employ two oppositely disposed rollers on account of the pressure exerted on the cylinder and the power required to operate the machine.

Briefly stated, my invention contemplates a machine comprising a revoluble perforate cylinder and a revoluble head located within said cylinder and provided with a plurality of blades spaced equidistant adjacent to the inner face of the cylinder and angularly disposed relatively thereto. The revoluble head and the blades revolve in a direction opposite to the direction of travel of the cylinder and the blades are inclined inwardly away from the cylinder in the direction of travel of the blades. This arrangement provides a plurality of wedge-shaped pockets for receiving the feed or plastic material to be molded. As the two members revolve in opposite directions, the blades exert wiping action which forces the material through the apertures. Due to the plurality of the wedge-shaped pockets the machine is uniformly loaded and operates at uniform pressure and at an increased capacity.

Referring by numerals to the accompanying drawings, 10 indicates a cylinder and 11 a revolving head arranged therein. One end of the cylinder is closed by a wall 12 having a hub 14 which latter is fixed on one end of a horizontally disposed shaft 16. This shaft is journaled in bearings 17 formed in spaced supports 18.

The revolving head 11 is fixed to one end of a horizontally disposed shaft 19. Shafts 16 and 19 are arranged coaxially so that the revolving head 11 is concentrically disposed in cylinder 10. Shaft 19 is journaled in bearings 20 formed on spaced supports 21. Both supports 18 and 21 are fixed to and extend upwardly from a base 22.

The end of cylinder 10 disposed opposite to wall 12 is closed by a circular plate 24 which is fixed to cylinder 10 by suitable fastening devices 25. A stationary plate 26 is supported in position by brackets 27 which are secured to said plate and to the inner one of supports 21 and cooperate with circular plate 24 in closing this end of the cylinder. Plates 24 and 26 have step engagement with each other so as to provide a joint which closes the cylinder and at the same time permits operative engagement between said stationary plate 26 and the revoluble plate 24. This stationary plate is provided with a central opening through which the shaft 19 extends inwardly into the cylinder and is provided in its upper half with an opening in which is received hopper 28 through which the material is fed into the cylinder.

The revolving head 11 comprises a central portion 29 with which are formed integral and extend radially therefrom a series of arms 30. Preferably these arms are spaced equidistant about the axis of shaft 19 and their outer ends terminate in elongated flanged portions 31, the width of which is slightly less than the width of the chamber formed by the cylinder. Flanged portions 31 are disposed angularly relatively to the inner face 10a of cylinder 10 so as to provide wedge-shaped pockets which open in the direction of travel of the revolving head as indicated by arrow A. Preferably the rear end of each flanged portion 31 or that end which is nearest the cylinder is provided with a detachable plate 32 so that it can be replaced when worn out. This detachable plate is secured in position in any suitable manner, such as fastening devices 34.

The peripheral wall of the cylinder is provided with a plurality of spaced radially disposed molds or orifices 35 through which the material is squeezed or extruded from the cylinder during the operation of the machine. These orifices are of suitable cross sectional areas so as to impart the proper cross sectional contour to the material as it leaves the cylinder. Preferably the inner end of each mold or orifice is enlarged or elongated in the direction opposite to the travel of the revolving head, thereby providing mouth 36 having inclined wall 37. This arrangement of the inner or receiving end of each mold or orifice facilitates the entrance of the material thereinto and insures the molded material to be of proper density. The cylinder is revolved in a direction opposite to the direction of travel of the revolving head 11, the direction of travel of the cylinder being indicated by arrows marked B while the direction of travel of the revolving head being indicated by arrows marked A.

The material to be molded, such as stock feed ground to proper fineness and preferably mixed with suitable liquid, is admitted into the chamber of the cylinder through hopper 28. There the material is worked by the arms 30 and is then collected between the flanged portions 31 and the inner face of the cylinder. As said cylinder and said flanged portions revolve in opposite direction, the material is squeezed into the wedge-shaped pockets and is forced into the orifices 35 by the wiping action produced by flanged portion 31 and plates 32. As the cylinder revolves it carries the extruded material with it and when said material reaches a certain point it is severed from the cylinder by a stationary knife 38. This knife is carried by a bracket 39 which is secured to base 22 and projects upwardly therefrom. Said knife is disposed at an angle so as to permit the severed molded material to drop downwardly into a suitable receptacle, not shown. In order to obtain the best results, the cylinder and the revolving head are operated at differential speeds relatively to each other, the speed of the cylinder being about four times greater than the speed of the revolving head.

The driving connections for the cylinder and the revolving head are actuated by means of a horizontally disposed shaft 40 which extends the full length of the machine and is journaled in bearings 41 carried by supports 42. Supports 42 are spaced suitable distances apart, preferably in correlation with the supports 18 and 21. One end of shaft 40 has fixed thereon a pulley 44 over which operates a belt 45 driven in any suitable manner. Gear 46 is fixed to shaft 40 near the opposite end thereof and this gear meshes with a gear 47 which is of substantially the same size and is fixed on shaft 16. Thus the cylinder 10 is actuated in a direction opposite to the direction of shaft 40 and in the present instance at the same speed.

A large gear 48 is fixed on shaft 19 and this gear meshes with an idler 49 which is fixed on a shaft 50. This shaft is journaled in suitable bearings formed in supports 21 suitable distance below cylinder 10. Idler 49 meshes with a gear 51 which is fixed on shaft 40. A casing 52 encloses gears 48, 49 and 51 while a casing 54 encloses gears 46 and 47.

Thus by interposing idler 49 in the gear drive of shaft 19 the direction of rotation of the revolving head 11 is reversed with respect to the direction of rotation of cylinder 10 and the speed of the revolving head is reduced as desired by employing gear 48 of substantially large diameter as compared with gear 51.

The disposition of flanged portions or blades 31 angularly with respect to the inner face 10a of cylinder 10 insures lodgment of the plastic material in the wedge-shaped pockets formed therebetween and the movements of cylinder and blades in opposite directions produces wiping action which causes the material to enter the molds or orifices 35 by the friction produced between the two oppositely moving surfaces. This arrangement not only facilitates the extrusion of the material from the cylinder but also produces friction necessary to maintain the material in proper plastic condition. As there are a number of blades 31 the load is equally distributed throughout the machine so that no part of the machine is subjected to abnormal strain. This not only assures smooth operation of the machine but also reduces the amount of power necessary to operate it.

The machine as shown and described herein has the cylinder revolving in a direction opposite to the rotation of the revolving head. However, in some cases it may be desirable to maintain the cylinder stationary and only the head 11 being revolved. In such a case the knife 38 could be so mounted as to cause it to travel over the outer face of the cylinder and sever the extruded material at regular intervals.

The movement of the obliquely disposed blades over the orifices causes the material to enter the latter by the friction produced upon the material. This friction also serves to maintain the material in proper plastic condition.

The orifices are shown round, but may be of polygonal shape or oval or of any contour desired. As stated before, the difference in speed between the cylinders and the revolving head is in the instant case about 4 to 1. However, under varying conditions this ratio may be changed to obtain best results.

Other changes in the construction and arrangement of parts of my machine may be made without departing from the spirit of my invention.

I claim:

1. A pellet making machine comprising a revoluble cylinder having a peripheral wall provided with a plurality of spaced mold orifices, and a revolving head arranged within said cylinder and provided with a plurality of blades, each of which is disposed angularly relative to the cylinder, the forward end of each blade being spaced therefrom to provide wedge-shaped pockets, said cylinder and said blades being revoluble in opposite directions to cause the plastic material contained in the cylinder to be extruded through the orifices by the wiping action of said blades.

2. A pellet making machine comprising a revoluble cylinder provided with a plurality of spaced radially disposed mold orifices, a plurality of blades arranged in spaced relation within said cylinder and revoluble about the axis thereof, each blade being disposed angularly relatively to the inner face of said cylinder whereby the forward end of each blade is spaced inwardly therefrom and the plastic material caught between the cylinder and said blades is extruded through said orifices by the friction exerted against said material by said blades, and means for actuating said cylinder and said blades in opposite directions.

3. A pellet making machine comprising a revoluble cylinder provided with a plurality of spaced radially disposed mold orifices, a plurality of blades arranged in spaced relation within said cylinder and revoluble about the axis thereof, each blade being disposed angularly relatively to the inner face of said cylinder whereby the forward end of each blade is spaced inwardly therefrom and the plastic material caught between the cylinder and said blades is extruded through said orifices by the friction exerted against said material by said blades, means for actuating said cylinder and said blades in opposite directions, and a severing member located exteriorly of said cylinder and cooperating therewith for cutting the extruded material into predetermined lengths.

4. A pellet making machine comprising a pair of coaxially and horizontally disposed shafts revoluble in opposite directions, a cylinder fixed to one end of one of said shafts, a revolving head fixed to the corresponding end of the other shaft and disposed within said cylinder, a plurality of blades carried by said head in spaced relation, each blade being angularly disposed to space the forward end of each blade from the inner face of said cylinder and bring the rear end of each blade in close proximity thereto, said cylinder and said blades being operable in opposite directions to produce wiping action and cause the plastic material to be extruded through said orifices by the friction exerted against said material by said blades.

5. A pellet making machine comprising in combination a pair of coaxially and horizontally disposed shafts revoluble in opposite directions, a cylinder fixed to one end of one of said shafts, a revolving head fixed to the corresponding end of the other shaft and disposed within said cylinder, a plurality of blades carried by said head in spaced relation, each blade being angularly disposed to space the forward end of each blade from the inner face of said cylinder and bring the rear end of each blade in close proximity thereto, said cylinder and said blades being operable in opposite directions to produce wiping action and cause the plastic material to be extruded through said orifices by the friction exerted against said material by said blades, and a stationary knife located exteriorly of said cylinder and cooperating with the peripheral surface thereof for cutting the extruded material into predetermined lengths.

6. A machine of the class described comprising a cylinder revolubly mounted and provided in its peripheral wall with a plurality of mold orifices, a revolving head mounted within said cylinder for movement in opposite direction relatively thereto, a plurality of blades carried in spaced-apart relation by said head, each blade being angularly disposed relatively to the inner face of said cylinder to space the forward end of each blade from said cylinder and bring the rear end thereof in close proximity thereto, thereby causing the plastic material contained in the cylinder to be extruded through said orifices by the wiping action produced by said blades.

7. A machine of the class described comprising a cylinder revolubly mounted and provided in its peripheral wall with a plurality of mold orifices, a revolving head mounted within said cylinder for movement in opposite direction relatively thereto, a plurality of blades carried in spaced-apart relation by said head, each blade being angularly disposed relatively to the inner face of said cylinder to space the forward end of each blade from said cylinder and bring the rear end thereof in close proximity thereto, thereby causing the plastic material contained in the cylinder to be extruded through said orifices by the wiping action produced by said blades, and means for actuating said cylinder and said revolving head in opposite directions and at differential speeds.

8. A machine of the class described comprising a cylinder revolubly mounted and provided in its peripheral wall with a plurality of mold orifices, a revolving head mounted within said cylinder for movement in opposite direction relatively thereto, a plurality of blades carried in spaced-apart relation by said head, each blade being angularly disposed relatively to the inner face of said cylinder to space the forward end of each blade from said cylinder and bring the rear end thereof in close proximity thereto, thereby causing the plastic material contained in the cylinder to be extruded through said orifices by the wiping action produced by said blades, and severing means located exteriorly of said cylinder for cutting the extruded material into predetermined lengths.

9. A machine of the class described comprising a cylinder revolubly mounted and provided in its peripheral wall with a plurality of mold orifices, a revolving head mounted within said cylinder for movement in opposite direction relatively thereto, a plurality of blades carried in spaced-apart relation by said head, each blade being angularly disposed relatively to the inner face of said cylinder to space the forward end of each blade from said cylinder and bring the rear end thereof in close proximity thereto, thereby causing the plastic material contained in the cylinder to be extruded through said orifices by the wiping action produced by said blades, and a wearing plate detachably secured to each rear end of said blade at the point of greatest wear thereof.

10. In a machine of the class described, the combination of a revoluble cylinder provided in its peripheral wall with a plurality of spaced mold orifices, a revolving head disposed in said cylinder and operable in opposite directions relatively thereto, a plurality of blades carried by said revolving head and angularly disposed relatively to the inner face of said cylinder, the forward end of each blade being spaced from the inner face of said cylinder and the inner end of each blade being arranged in close proximity thereto, a detachable plate arranged on the rear end of each blade to provide a renewable wearing member for the blade, and means for actuating said revolving head and said cylinder in opposite directions and at differential speeds whereby the plastic material contained in the cylinder is caused to be deposited in the wedge-shaped pockets formed by the blades and said cylinder and forced outwardly through the mold orifices by the wiping action of said blades.

11. In a machine of the class described, the combination with a revolving head having a plurality of blades, of a revoluble cylinder enclosing said head and said blades and provided in its peripheral wall with a plurality of spaced mold orifices, the inner end of each orifice being provided with an elongated forwardly and upwardly inclined mouth for receiving the plastic material forced thereinto by the wiping action of said blades.

12. In a machine of the class described, a cylinder adapted to receive plastic material, and revolving blades for forcing said plastic material therefrom, said cylinder being provided in its peripheral wall with a plurality of mold orifices, the inner ends of which are elongated in the direction opposite to the direction of rotation of said blades.

13. A pellet making machine comprising in combination a cylinder adapted to receive plastic material and provided in its peripheral wall with a plurality of spaced mold orifices, a revoluble shaft, the inner ends of said orifices being enlarged in a direction opposite to the direction of rotation of said shaft, and a plurality of blades fixed on said shaft and disposed within said cylinder, said blades being obliquely arranged relatively to the inner face of said peripheral wall to produce wiping action upon said plastic material and cause it to be extruded through said orifices.

14. A pellet making machine comprising in combination a cylinder adapted to receive plastic material and provided in its peripheral wall with a plurality of spaced mold orifices, a revoluble shaft, the inner ends of said orifices being enlarged in a direction opposite to the direction of rotation of said shaft, a plurality of blades fixed on said shaft and disposed within said cylinder, said blades being obliquely arranged relatively to the inner face of said peripheral wall to produce wiping action upon said plastic material and cause the latter to be extruded through said orifices, and severing means located exteriorly of said cylinder and cooperating therewith for cutting the extruded material into predetermined lengths.

In testimony whereof I hereunto affix my signature this 16th day of September, 1930.

BURR M. ESTES.